United States Patent
Kopinsky

(10) Patent No.: US 11,544,559 B2
(45) Date of Patent: Jan. 3, 2023

(54) SYSTEM AND METHOD FOR EXECUTING CONVOLUTION IN A NEURAL NETWORK

(71) Applicant: Neuralmagic Inc., Somerville, MA (US)

(72) Inventor: Justin Kopinsky, Cambridge, MA (US)

(73) Assignee: Neuralmagic Inc., Somerville, MA (US)

(*) Notice: Subject to any disclaimer, the term of this patent is extended or adjusted under 35 U.S.C. 154(b) by 458 days.

(21) Appl. No.: 16/737,280

(22) Filed: Jan. 8, 2020

(65) Prior Publication Data
US 2020/0218978 A1    Jul. 9, 2020

Related U.S. Application Data

(60) Provisional application No. 62/789,666, filed on Jan. 8, 2019.

(51) Int. Cl.
*G06N 3/08* (2006.01)
*G06F 17/16* (2006.01)
*G06N 20/10* (2019.01)

(52) U.S. Cl.
CPC .............. *G06N 3/08* (2013.01); *G06F 17/16* (2013.01); *G06N 20/10* (2019.01)

(58) Field of Classification Search
CPC ........... G06N 3/08; G06N 20/10; G06F 17/16
See application file for complete search history.

(56) References Cited

U.S. PATENT DOCUMENTS

| 5,577,166 A | 11/1996 | Mizuno |
| 7,747,070 B2* | 6/2010 | Puri .................. G06N 3/06 706/15 |

(Continued)

FOREIGN PATENT DOCUMENTS

| CN | 107832839 | 3/2018 |
| EP | 3 037 980 | 6/2016 |

(Continued)

OTHER PUBLICATIONS

Smith et al., "SPLATT: Efficient and parallel sparse tensor-matrix multiplication", 2015 IEEE International Parallel and Distributed Processing Symposium, IEEE, 2015.

(Continued)

*Primary Examiner* — Elias Desta
(74) *Attorney, Agent, or Firm* — Pearl Cohen Zedek Latzer Baratz LLP

(57) ABSTRACT

A system and method of executing a convolution layer of a neural network may include: (a) selecting an output spatial position (OSP) of an output matrix data element of the convolution layer; (b) selecting, based on the selected OSP, a non-zero input element of an input matrix data element; (c) producing, based on the selected OSP, a vector of kernel elements from a kernel matrix data element; (d) performing a vectoral multiplication operation of the selected non-zero input element and the vector of kernel elements, and accumulating a product of the vectoral multiplication in a vector register of a processor; (e) repeating (c) and (d) with subsequent non-zero input elements and corresponding vectors of kernel elements to obtain an outcome of the convolution of the selected OSP; and (f) repeating (a) through (e) with subsequent selection of OSPs, to obtain an outcome of the convolution layer.

19 Claims, 8 Drawing Sheets

(56) References Cited

U.S. PATENT DOCUMENTS

| | | | |
|---|---|---|---|
| 9,558,156 | B1 | 1/2017 | Bekas et al. |
| 9,811,775 | B2 | 11/2017 | Krizhevsky et al. |
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,430,913 | B2 * | 10/2019 | Chen .................. G06T 1/20 |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 2010/0076915 | A1 | 3/2010 | Xu et al. |
| 2011/0119467 | A1 | 5/2011 | Cadambi et al. |
| 2013/0138589 | A1 | 5/2013 | Yu et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0103313 | A1 | 4/2017 | Ross et al. |
| 2017/0103317 | A1 | 4/2017 | Young |
| 2017/0132496 | A1 | 5/2017 | Shoaib et al. |
| 2017/0169567 | A1 | 6/2017 | Chefd'Hotel et al. |
| 2017/0193361 | A1 | 7/2017 | Chilimbi et al. |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0032487 | A1 | 12/2017 | Ashari et al. |
| 2017/0372202 | A1 | 12/2017 | Ginsburg et al. |
| 2018/0046900 | A1 | 2/2018 | Dally et al. |
| 2018/0096226 | A1 | 4/2018 | Aliabadi et al. |
| 2018/0173571 | A1 | 6/2018 | Huang et al. |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1 | 11/2018 | Kadav et al. |
| 2019/0042250 | A1 | 2/2019 | Anders et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0179818 | A1 | 6/2019 | Lee |
| 2019/0212982 | A1 | 7/2019 | Yoda et al. |
| 2019/0303743 | A1 | 10/2019 | Venkataramani et al. |
| 2019/0354894 | A1 | 11/2019 | Lazovich et al. |
| 2019/0370071 | A1 | 12/2019 | Matveev et al. |
| 2019/0370644 | A1 | 12/2019 | Kenney et al. |
| 2020/0034710 | A1 | 1/2020 | Sidhu et al. |
| 2020/0097826 | A1 | 3/2020 | Du et al. |
| 2020/0104717 | A1 | 4/2020 | Alistarh |
| 2020/0160181 | A1 | 5/2020 | Zlateski et al. |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |
| 2020/0342301 | A1 | 10/2020 | Miao et al. |

FOREIGN PATENT DOCUMENTS

| | | |
|---|---|---|
| WO | WO 2017049496 | 3/2017 |
| WO | WO 2018053835 | 3/2018 |
| WO | WO 2019090325 | 5/2019 |
| WO | WO 2020/046859 A1 | 3/2020 |
| WO | WO-2020047823 A1 | 3/2020 |
| WO | WO 2020/072274 A1 | 4/2020 |

OTHER PUBLICATIONS

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396.

Kurtz, Mark, et al. "Inducing and Exploiting Activation Sparsity for Fast Neural Network Inference." Proceedings of the International Conference on Machine Learning. 2020.

Robert Lim; "Methods for Accelerating Machine Learning in High Performance Computing"; University of Oregon—AREA—Jan. 2019.

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Lsrat Nisa et al.; "Sampled Dense Matrix Multiplication for High-Performance Machine Learning"; 2018 IEEE 25th International Conference on High Performance Computing (Hi PC).

Kaya et al., "Scalable sparse tensor decompositions in distributed memory systems", SC'15: Proceedings of the International Conference for High Performance Computing, Networking, Storage and Analysis, IEEE, 2015.

Alwani et al., "Fused-layer CNN accelerators." 49th Annual IEEE/ACM International Symposium on Microarchitecture (MICRO), 2016, pp. 1-12.

Chen, Xuhao, "Escoin: Efficient Sparse Convolutional Network Inference on GPUs", Conference'17, Jul. 2017, Washington, DC, USA, retrieved from https://arxiv.org/pdf/1802.10280.pdf.

Despande, Adit, "A Beginner's Guide To Understanding Convolutional Neural Networks", Jul. 20, 2016, retrieved from https://adeshpande3.github.io/A-Beginner%27s-guide-to-understanding-convolutional-neural-networks/ entire document.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015, arXiv:1503.02531v1.

Lavin et al., "Fast Algorithms for Convolutional Neural Networks", Nov. 10, 2015, arXiv:1509.09308v2.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017, arXiv:1711.05852v1.

Rusu et al., "Progressive Neural Networks", Sep. 7, 2016, arXiv:1606.04671v3.

Scardapane et al., "Group Sparse Regularization for Deep Neural Networks", Neurocomputing, Jul. 2, 2016, Retrieved Nov. 16, 2019 from https://arxiv.org/pdf/1607.00485.pdf.

Budden et al., "Deep tensor convolution on multicores", In Proceedings of the 34th International Conference on Machine Learning, 2017, vol. 70, pp. 615-624.

Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.org/pdf/1808.05567 .pdf> entire document.

Kim et al., "Designing Vector-Friendly Compact BLAS and LAPACK Kernels", SC17, Nov. 12-17, 2017, Denver, CO, USA.

Lascorz et al., "Bit-Tactical: Exploiting Ineffectual Computations in Convolutional Neural Networks: Which, Why, and How", Mar. 9, 2018, arXiv:1803.03688v1.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020 (Jan. 17, 2020) from <http://openaccess.thecvf.com/content_cvpr_2015/papers/Liu_Sparse_Convolutional_Neural_2015_CVPR_paper.pdf> entire document.

(56) References Cited

OTHER PUBLICATIONS

Papyan et al., "Convolutional neural networks analyzed via convolutional sparse coding." In: The Journal of Machine Learning Research. Jul. 17, 2017 (Jul. 17, 2017) Retrieved on Feb. 20, 2020 from <http://www.jmlr.org/papers/volume18/16-505/16-505.pdf> entire document.

Wozniak et al., "GiMMiK—Generating bespoke matrix multiplication kernels for accelerators: Application to high-order Computational Fluid Dynamics", Computer Physics Communications, vol. 202, 2016, pp. 12-22.

\* cited by examiner

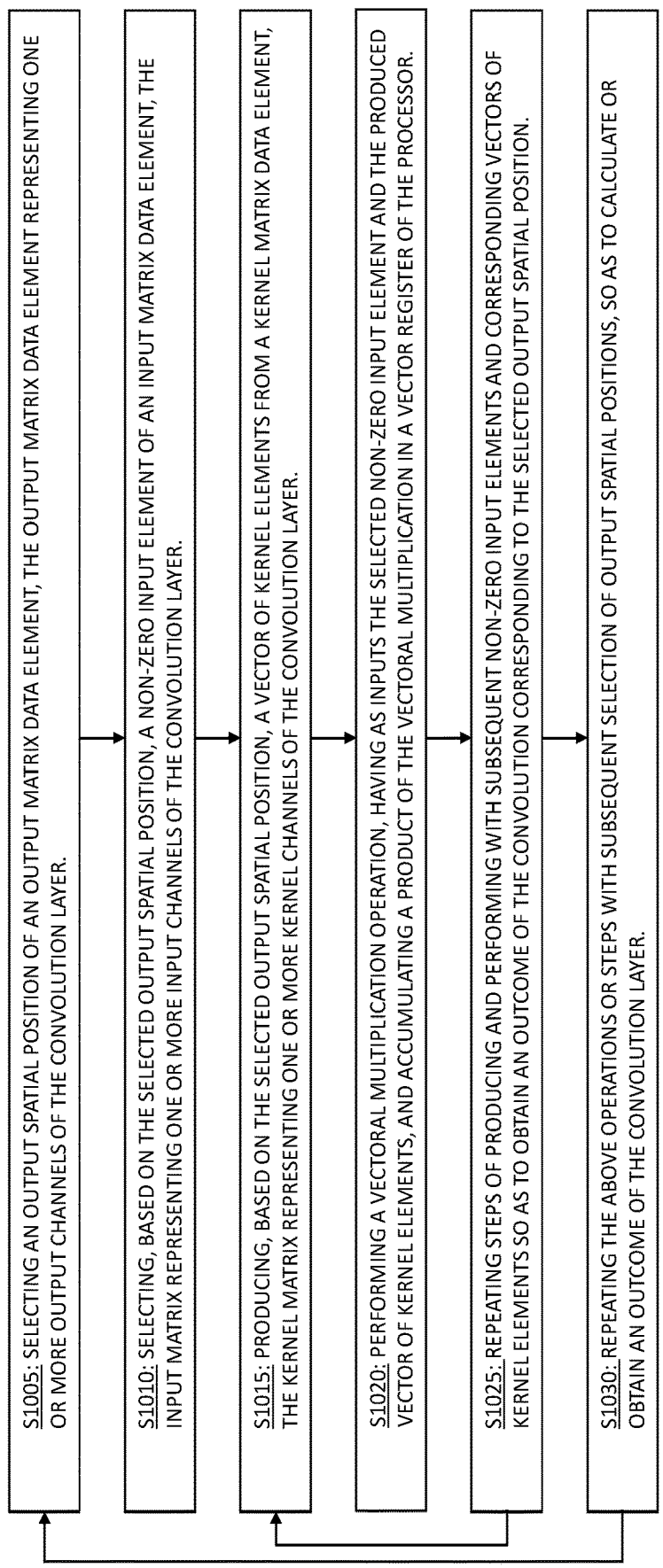

SYSTEM AND METHOD FOR EXECUTING CONVOLUTION IN A NEURAL NETWORK

RELATED APPLICATION DATA

The present application claims priority from US provisional patent application 62/789,666, filed on Jan. 8, 2019 and entitled "EFFICIENT COMPRESSED CONVOLUTION USING ACTIVATION SPARSITY" incorporated by reference herein in its entirety.

FIELD OF THE INVENTION

The present invention relates generally to the field of neural networks. More specifically, the present invention relates to systems and methods for efficient compressed convolution using activation sparsity.

BACKGROUND OF THE INVENTION

As known to persons skilled in the art, a neural network (NN), e.g. a neural network implementing machine learning (ML), may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are not physical entities, but are rather virtual, represented by mathematical constructs, such as activation functions and matrices of data elements and weights. A processor, e.g. CPUs or Graphics Processing Units (GPUs), or a dedicated hardware device may perform the relevant calculations, and thus may be or act as the NN, modeling the nodes and links as mathematical operations.

As known to persons skilled in the art, GPUs and similar massively parallel hardware accelerators such as Tensor Processing Units (TPUs) and Image Processing Units (IPUs) are commonly used to provide the large amount of computational power needed to train and/or perform inference (e.g., at run time or execution) in NNs.

Such parallel computing devices normally include a large number of relatively weak computing cores, associated with relatively small cache memory spaces and high memory bandwidth. The cores of such parallel computing devices normally execute instructions in a SIMD (Single Instruction Multiple Data) synchronous or semi-synchronous manner, meaning that they may execute the same instruction together at about the same time.

In contrast, traditional CPU architectures normally include a relatively small number of powerful cores associated with large cache memory spaces and a low memory bandwidth, where each computing core is adapted to execute different instructions at different times in an asynchronous fashion.

A common assumption in the industry is that highly parallelized computation (e.g., as provided by systems of hardware acceleration such as GPUs) is necessary to execute mathematical computations of deep neural networks at an acceptable throughput rate. CPUs may, according to this line of thinking, only suffice for tasks of sequential computation, and therefore specialized hardware accelerators may be required in order to execute ML tasks such as training and/or inferring NNs.

SUMMARY OF THE INVENTION

Embodiments of the invention may include a method that may by utilize a natural sparsity that may be inherent in neural network computations, so as to allow commercially available CPUs to provide NN execution performance that may be competitive with accelerators GPUs and TPUs.

As known in the art, NNs can be described by having their weights and inputs represented as matrices. Computation (e.g., inference) of the represented NN may include a sequential multiplications of these matrices. Thus, fast matrix multiplication algorithms may aid the performance of neural networks.

Embodiments of the invention may exploit properties of these matrices to improve NN execution and expediate matrix multiplication algorithms such as matrix convolution and/or multiplication, as described herein. One such property is sparsity—a matrix is said to be sparse if it contains a large number of zero valued entries. During matrix multiplication, if computations related to zero elements are never performed, then an overall number of computations may be reduced if one could branch accordingly (e.g., execute the multiplication if the matrix entry is non-zero or do nothing otherwise).

Embodiments of the invention may include a method of executing a convolution layer of a neural network, by at least one processor. Embodiments of the method may include the operations or steps of: (a) receiving an input matrix data element which may be sparse (e.g., due to activation sparsity, as explained herein) and may represent input data of the convolution layer (e.g., including one or more input channels); (b) receiving a kernel matrix data element which may represent one or more kernel channels of the convolution layer; (c) compressing the sparse input matrix data element to obtain a compressed input representation of the input data, which may be devoid of zero-value input data elements; (d) selecting an output spatial position of an output matrix data element, the output matrix data element representing one or more output channels of the convolution layer; (e) performing a multiplication and accumulation (MAC) operation on or pertaining to the selected output spatial position. The MAC operation may have as inputs: a specific input data element of the compressed input representation and one or more kernel data elements of the kernel matrix data element; (f) iterating or repeating step (e) until all MAC calculations on or pertaining to the selected output spatial position and including the specific input data element may be exhausted; (g) repeating steps (e) and (f) with a subsequent specific input data element of the compressed input representation; and (h) repeating steps (d) through (g) with subsequent output spatial positions, to obtain an outcome of the convolution layer.

Embodiments of the invention may include a system for executing a convolution layer of a neural network. Embodiments of the system may include: a non-transitory memory device, wherein modules of instruction code may be stored, and at least one processor associated with the memory device, and configured to execute the modules of instruction code. Upon execution of said modules of instruction code, the processor may be further configured to: (a) select an output spatial position of an output matrix data element, the output matrix data element representing one or more output channels of the convolution layer; (b) select, based on the selected output spatial position, a non-zero input element of an input matrix data element, the input matrix representing one or more input channels of the convolution layer; (c) produce, based on the selected output spatial position, a vector of kernel elements from a kernel matrix data element, the kernel matrix representing one or more kernel channels of the convolution layer; (d) perform a vectoral multiplication operation, having as inputs the selected non-zero input element and the produced vector of kernel elements, and accumulate a product of the vectoral multiplication in a vector register of the processor; (e) iterate or repeat steps (c) and (d) with subsequent non-zero input elements and corresponding vectors of kernel elements so as to obtain an outcome of the convolution corresponding to the selected output spatial position; and (f) iterate or repeat steps (a) through € with subsequent selection of output spatial positions, so as to obtain an outcome of the convolution layer.

Embodiments of the invention may include a method of executing a convolution layer of a neural network, by at least one processor. Embodiments of the method may include: (a) selecting an output spatial position of an output matrix data element, the output matrix data element representing one or more output channels of the convolution layer; (b) selecting, based on the selected output spatial position, a non-zero input element of an input matrix data element, the input matrix representing one or more input channels of the convolution layer; (c) producing, based on the selected output spatial position, a vector of kernel elements from a kernel matrix data element, the kernel matrix representing one or more kernel channels of the convolution layer; (d) performing a vectoral multiplication operation, having as inputs the selected non-zero input element and the produced vector of kernel elements, and accumulating a product of the vectoral multiplication in a vector register of the processor; (e) repeating steps (c) and (d) with subsequent non-zero input elements and corresponding vectors of kernel elements so as to obtain an outcome of the convolution corresponding to the selected output spatial position; and (f) repeating steps (a) through € with subsequent selection of output spatial positions, so as to obtain an outcome of the convolution layer.

According to some embodiments of the invention, the selected output spatial position may correspond to a vector of indices of the output matrix and at least one (e.g., each) index of the vector of indices may pertain or relate to a different output channel of the convolution layer. The products of vectoral multiplications may be accumulated in vector registers (e.g., elements 4B of FIG. 2) such that in at least one (e.g., each) vector register, at least one (e.g., each) element may correspond to a different output channel of the convolution layer.

According to some embodiments of the invention, the at least one processor may be configured to select a non-zero input element by: determining a position of the input matrix, corresponding to the selected output spatial position; obtaining a vector of input elements of the input matrix corresponding to the determined input spatial position, wherein each input element of the vector of input elements corresponds to a different input channel; compressing the vector of input elements to produce a compressed input vector data element, devoid of zero-valued input elements; and traversing an index of the compressed input data element to select non-zero input elements.

According to some embodiments of the invention, the produced compressed input vector data element may be a Compressed Sparse Row (CSR) representation of the input matrix.

According to some embodiments of the invention, the at least one processor may be configured to preload, in a first iteration of a selected output spatial position, one or more compressed input data elements to a cache memory associated with the at least one processor, where the preloaded one or more compressed input data elements may pertain to computation of a second, subsequent iteration of a selected output spatial position.

According to some embodiments of the invention, at least one (e.g., each) kernel element of the vector of kernel elements may correspond to a different kernel filter. The kernel vector may be sequentially stored in a memory device associated with the at least one processor (e.g., elements 4A, 4C of FIG. 2), so as to enable contiguous reading (e.g., by processor 2) of the kernel vector from the memory device (e.g., elements 4A, 4C).

According to some embodiments of the invention, output data elements having a specific spatial position (e.g., corresponding to vectors of indices of the output matrix pertaining to different output channels) may be sequentially stored in a memory device associated with the at least one processor. This may enable contiguous reading (e.g., by processor 2) of output data elements corresponding to a specific output spatial position.

According to some embodiments of the invention, the processor 2 may be configured to preload, in a first iteration (e.g., describing or pertaining to a first selected non-zero input data element) one or more kernel elements of the kernel matrix, pertaining to one or more kernel channels, the processor 2 may preload the one or more kernel elements to a cache memory associated with the at least one processor. The preloaded one or more kernel elements may pertain to computation of a second, subsequent iteration (e.g., pertaining to a second selected non-zero input data element).

According to some embodiments of the invention, the processor or controller may be configured to produce the vector of kernel elements by: selecting a kernel position of the kernel matrix data element; obtaining one or more kernel elements of the kernel matrix data element, corresponding to the selected kernel position. According to some embodiments, at least one (e.g., each) obtained kernel element may correspond to a different kernel channel of the convolution layer, and at least one (e.g., each) obtained kernel element may correspond to computation of an output of the convolution layer at the selected output spatial position.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a flow diagram depicting a method of executing a convolution layer of a neural network, by at least one processor, according to some embodiments.

Figure 1:
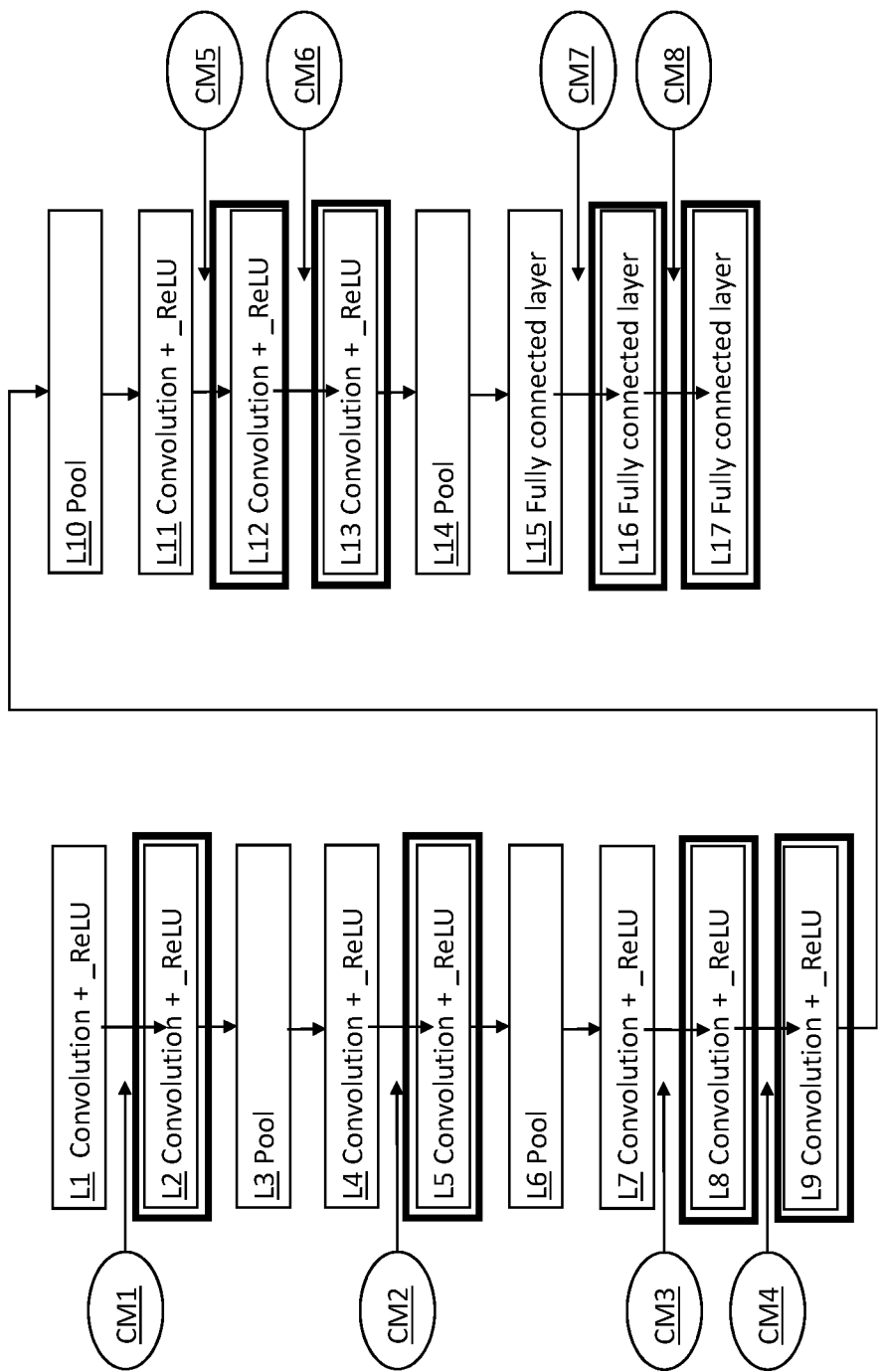
FIG. 1 is schematic diagram showing an example of a deep neural network.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for performing compressed convolution using activation sparsity Reference is now made to FIG. 1, which is a schematic block diagram depicting an example of a deep neural network, such as a convolutional neural networks (CNNs), as known in the art.

As shown in FIG. 1 and as known in the art, neural networks and particularly convolutional neural networks (CNNs), may include a plurality of layers such as convolutional layers, fully connected layers, pooling layers, etc. The layers may include nodes or neurons, possibly associated with weights, and linking neurons to other neurons to transfer values between neurons. Implementations of NNs may include convolutional layers that may be succeeded by Rectified Linear Units (ReLUs). Such ReLUs may typically be configured to nullify input values of subsequent (e.g. more towards an output layer) layers (e.g., convolutional layers) that are beyond a predefined range (e.g., values that are negative). Consequently, an output of an NN layer including ReLU functionality (and thus the input to a following convolutional layer) may be sparse. Such sparsity of data may be referred herein as "activation sparsity", as it may derive or originate from input data during a stage of activation or inference of the NN on the input data. Embodiments of the invention may exploit sparsity of framed layers, as depicted in the example of FIG. 1, to apply efficient compressed convolution, as elaborated herein.

For example, after execution of the ReLU in layer L1, the inputs to the subsequent (e.g. more towards an output) layer L2 may be sparse. In another example, inputs and outputs of the convolution+ReLU layer L8 may also be sparse. In yet another example, input to fully connected layers L16 and L17 may also be made sparse (e.g., by fully connected layer L15). In contrast, outputs of pooling layers do not normally include ReLUs, and so layers (e.g., L4, L7, L15) that follow a pooling layer typically may not have sparse inputs (but may have some zero input values).

The term "activation sparsity" may be used herein to refer to sparsity that may originate or may be generated from the natural activity of the network execution (e.g., due to the sparsifying behavior of the ReLUs) and may refer to the data that is passed from layer to layer. In a complementary manner, the term "non-activation sparsity" may be used herein to refer to sparsity that does not originate from the natural activity of the network execution, but, for example, from processes that may precede execution or inference of the NN. Non-activation sparsity may include, for example, sparsity that may result from pruning the network's weights or kernel values.

As known in the art, currently available systems may be configured to exploit non-activation sparsity (e.g., sparsity of kernel matrices) to improve efficiency or throughput of a convolution layer in a NN (e.g., CNN) model.

It may be appreciated by a person skilled in the art, that exploitation of activation sparsity of input matrices may differ from exploitation of non-activation sparsity in a variety of aspects:

For example, exploitation of activation sparsity may not require additional training process: the same network model that may be executed or inferred on a dense version of the NN may also be executed or inferred on a sparse version thereof.

In another example, as the input to the NN model is generally unknown, so are the outputs of various layers therein. In other words, content of input matrices of various layers of the NN is unknown prior to inference of the NN on newly introduced input data. Therefore, exploitation of activation sparsity may require careful formation and processing of data structures in real-time (e.g., substantially at the same time of obtaining input data), as elaborated herein.

As discussed herein, embodiments of the invention may exploit activation sparsity to reduce the amount of required computations during a convolution by avoiding operations of multiplication with zero-valued elements. Additionally or alternatively, embodiments of the invention may significantly reduce data movement (and thus memory bandwidth) between layers by compressing activation-sparse matrices.

As the pattern of zeros in activation-sparse input matrices may normally be unpredictable, one may naively avoid computing multiplication of zero-valued elements by performing a test or a branch in the flow of computation during run time (e.g., to test or check whether an element has a zero value and perform an operation based on the outcome of the test). As known in the art, such 'branching' of a computing process or thread may be a time-wise costly operation. For example, on a GPU, the cost of such a branch may be breaking of the "swarm," (e.g., the collective operation of GPU core operations): A branch may cause some GPU cores to perform a first operation and cause other cores to perform a second, different operation, leading to low utilization of the GPUs synchronous SIMD execution scheme. In another example, on a CPU, the effect of branching a computing thread or process may not be as dramatic as in the example of the GPU, but nevertheless, such branching may still be a costly instruction.

Embodiments of the invention may facilitate efficient computing, on a commodity CPU, of convolution in a NN model, by utilizing activation sparsity of input to one or more layers of the NN. Additionally, as elaborated herein (e.g., in relation to FIG. 6), embodiments of the invention may compress the activation-sparse input data to a compressed format that may be devoid of zero-value input data elements, and may thus avoid branching or testing of input data elements at run time. The term "compressed convolution" may therefore be used herein to refer to executing a convolution operation in a layer of a NN, wherein at least one input data structure or element of the convolution operation has a compressed format, devoid of zero-value input data elements.

It may be appreciated by persons skilled in the art that variants of the compressed convolution algorithm may be applied also to sparsity in the inputs to fully connected layers of a CNN.

Embodiments of the invention may include computing a direct convolution when the input is given as a compressed sparse matrix, and the weights are given as a dense matrix with a standard representation. For example, embodiments may include compressing the sparse input matrix using a CSR compression format. Other compression methods or compression formats may also be used.

Embodiments of the invention may maximize resource utilization by examining only the non-zero values of the input (e.g., of an input matrix). This constitutes an improvement over standard implementations of direct convolutions in many NN architectures because inputs to a convolutional layers frequently have large proportions of zeros introduced by Rectified Linear Units (ReLUs) in the previous layer. For example, in the popular VGG16 network, the inputs to some convolutional layers have over 90% zeros.

On a given multiprocessor CPU, the maximum amount of computation that can be performed per cycle is fixed, hence efficiency is normally measured by compute utilization, e.g. a fraction of the time spent on actual computation on a given piece of data as opposed to the time spent accessing that piece of data from memory. In order to achieve high compute utilization on modern multiprocessors (e.g., including both CPUs and GPUs), one may use a vectoral multiplication operation or "vector processing instructions", as commonly referred to in the art, such as a vectoral fused multiply-add (FMA) or other multiply-accumulate operations, that operate on multiple words of data simultaneously. The term "vector" may be used herein to refer to an ordered set or series of data elements. Similarly, in the context of vectoral operations or instructions, the term "vectoral operation" may refer to a sequence of operations that may be performed serially (e.g., by a CPU) on one or more data elements of relevant data element vectors.

As known in the art, a vectoral FMA instruction may take three vectoral inputs, e.g., a, b and c, and may produce a vectoral output a*b+c, overwriting one of the inputs, typically c, with the result. Such FMA instructions may have different forms and formats in different specific processors, and may have different numbers or forms of inputs and outputs. When discussed herein, a specific set of inputs or outputs is an example used with one type of FMA instruction, and other sets of inputs or outputs may be used. Multiply-accumulate instructions other than FMA instructions may also be used.

Embodiments of the invention may include any instruction set that may provide vectoral FMA instructions. Henceforth, this description will not refer to a specific instantiation of a vector instruction set, but refer to vector FMA as any implementation of the instruction.

As known in the art, modern multiprocessors, such as Intel's Skylake CPU, may enable loading of up to two vectors of data into vector registers of the CPU and may perform two FMA instructions per computation cycle.

As explained herein, embodiments of the invention may provide an improvement over current methods and systems for executing convolution on NN layers by exploiting activation sparsity of one or more input matrices corresponding to the one or more NN layers. Pertaining to the example of the Skylake CPU, embodiments may ensure that both FMAs are effectively being run in as many of the cycles of the operation as possible. The term 'effectively' may indicate, in this context that FMA computations will not include zero-valued multiplications.

Additionally, due to the fact that in one embodiment each FMA requires three input registers (e.g., two multiplicands and an accumulator), embodiments may preload one or more of the input vectors into vector registers. The term "preloading" may refer in this context to an action of loading data to a memory device that may be associated with a processing unit (e.g., a cache memory device, which may be closely associated with a processor), in preparation to a future iteration of an arithmetic operation (e.g., a future FMA computation). As known in the art, such preloading of future-iteration data (e.g., in parallel or concurrent to computation of a current iteration) may improve a computing device throughput of the relevant computation.

Figure 2:
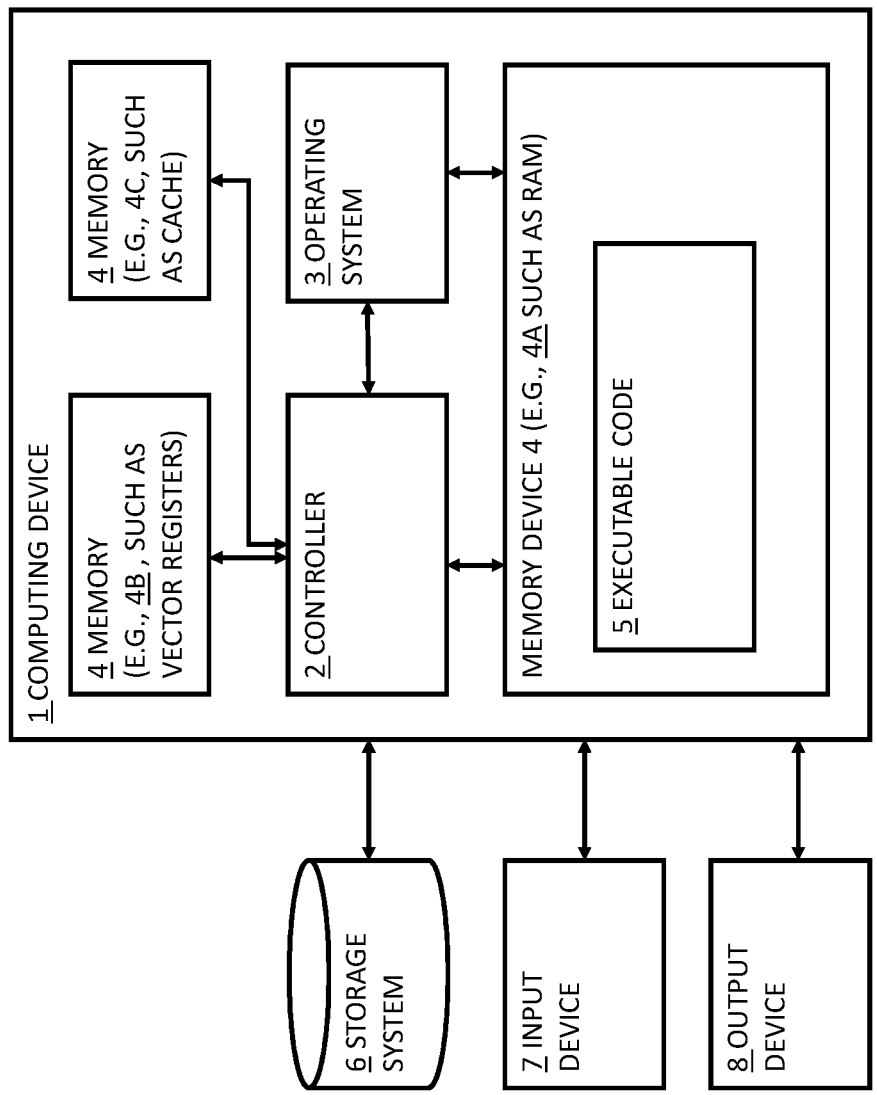
FIG. 2 is a block diagram, depicting a computing device which may be included in a system for performing compressed convolution using activation sparsity, according to some embodiments.

For example, embodiments may load two of the input vectors (e.g., a vector of input data elements and a vector of the accumulator) into vector registers (e.g., elements 4B of FIG. 2) and read values of the third data vector (e.g., a vector of kernel data elements) during run time from memory (e.g., elements 4A, 4C of FIG. 2). The term 'effectively' may indicate, in this context that embodiments of the invention may reuse the preloaded data across several consecutive FMA instructions in order to maximally utilize the CPUs given resources. As noted elsewhere, other FMA instruction formats, with other numbers of inputs or other numbers of outputs may be used, although typically regardless of the formats, the typical FMA accumulates multiplicands as discussed herein. For example certain data input to a vector or multiply-accumulate instruction may load different data directly from memory external to a processor and different data from a cache memory inside or local to the processor.

It may be appreciated by a person skilled in the art that operating on sparse data may introduce a number of challenges in this setting. For example, one cannot efficiently vectorize sparse data. When a data vector is loaded or stored, it typically accesses a contiguous chunk of memory. However, when data is sparse, embodiments of the invention may require accessing only locations corresponding to non-zero input values, which are not generally contiguous. In another example, as known to a person skilled in the art, each input value of a convolution may be multiplied by a plurality of kernel values and vice versa (e.g., each kernel value may be multiplied against many input values). Embodiments of the invention may exploit this observation to reuse data across multiple FMA instructions. However, in a condition where the input is sparse, the available reuse for the kernels is reduced significantly. This may require embodiments of the invention to take even more care to maximally reuse the input values, as elaborated herein.

Reference is now made to FIG. 2, which is a block diagram depicting a computing device, which may be included within an embodiment of a system for performing compressed convolution using activation sparsity, according to some embodiments.

Computing device 1 may include a controller or processor 2 that may be, for example, a central processing unit (CPU) processor, a chip or any suitable computing or computational device, and may include one or more processing cores, as known in the art.

Computing device 1 may include an operating system 3, one or more memory devices 4 (e.g., 4A, 4B and 4C), executable code 5, a storage system 6, input devices 7 and output devices 8. Memory 4A may be external—e.g. not on the same chip as controller 2—as opposed to on-chip cache or vector memory 4B and 4C. Controller 2 (or one or more controllers or processors, possibly across multiple units or devices) may be configured to carry out methods described herein, and/or to execute or act as the various modules, units, etc., e.g. by executing code or software stored in a memory or elsewhere. More than one computing device 1 may be included in, and one or more computing devices 1 may act as the components of, a system according to embodiments of the invention. For example, controller 2 may act as or be a NN during inference.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 (e.g., 4A) may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 (e.g., 4A) may be or may include a plurality of, possibly different memory units. Memory 4 (e.g., 4A) may be a computer or processor non-transitory readable medium, or a computer non-transitory storage medium, e.g., a RAM. In one embodiment, a non-transitory storage medium such as memory 4 (e.g., 4A), a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may perform compressed convolution using activation sparsity as further described herein. Although, for the sake of clarity, a single item of executable code 5 is shown in FIG. 2, a system according to some embodiments of the invention may include a plurality of executable code segments similar to executable code 5 that may be loaded into memory 4 (e.g., 4A) and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to execution or inference of a NN may be maintained in storage system 6 and may be loaded from storage system 6 into memory 4 (e.g., 4A) where it may be processed by controller 2. In some embodiments, some of the components shown in FIG. 2 may be omitted. For example, memory 4 (e.g., 4A) may be a non-volatile memory having the storage capacity of storage system 6. Accordingly, although shown as a separate component, storage system 6 may be embedded or included in memory 4 (e.g., 4A).

According to some embodiments, a memory device 4 (e.g., 4B) may be or may include at least one cache memory element that may be associated with at least one specific computing core of controller or processor 2. The at least one cache memory element 4B may be adapted to maintain one or more data elements describing or representing data and/or instruction code information pertaining to computation of a convolution in an NN layer. The one or more data elements may be received (e.g., from input device 7, from memory element 4A, etc.) and may be processed by processor or controller 2. According to some embodiments, one or more data elements pertaining to convolution (e.g., one or more kernel elements and/or one or more output elements) may be sequentially stored on memory device 4 (e.g., 4A, 4B) to facilitate serial or sequential processing thereof by controller or processor 2, as elaborated herein.

According to some embodiments, a memory device 4 (e.g., 4C) may be or may include one or more registers (e.g., vector registers) associated with at least one computing core of processor or controller 2. According to some embodiments, controller 2 may load (e.g., from RAM 4A, from cache 4B, etc.) one or more data elements pertaining to convolution (e.g., one or more kernel elements and/or one or more output elements) to perform a sequential operation (e.g., a vectoral FMA operation) on the content of the registers (e.g., the vector registers) in a single operation, as elaborated herein.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 3:
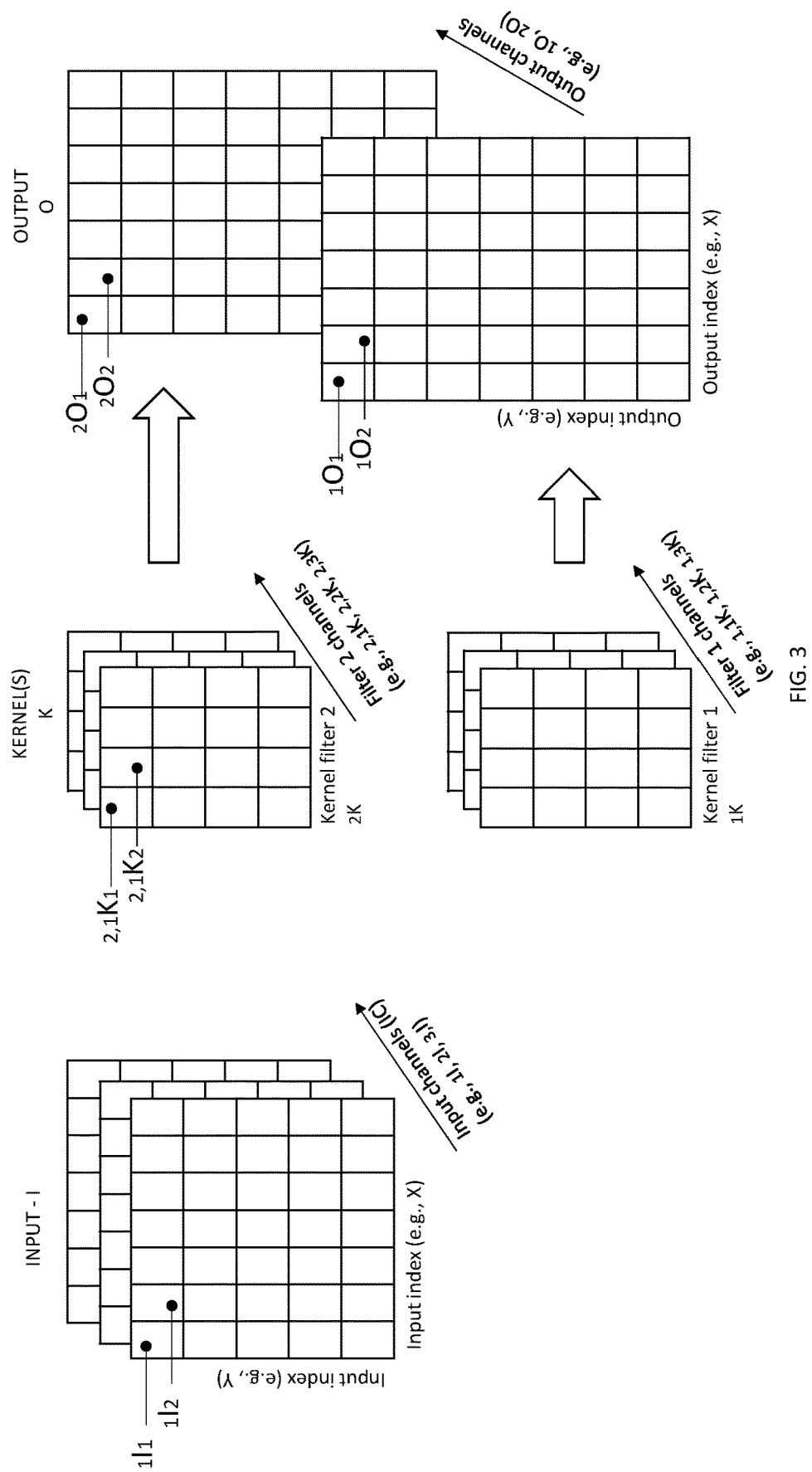
FIG. 3 is a schematic diagram, depicting an example of a multiple-channel convolution operation, as known in the art.

Reference is now made to FIG. 3 which is a schematic diagram, depicting an example of a multiple-channel convolution operation, as known in the art. As shown in FIG. 3, a convolution operation (e.g., convolution performed by a convolution layer of an NN) may be performed by (a) receiving input data that may be described by one or more input matrices or tensors (hereinafter input matrix data element(s), marked as 'I'); (b) receiving kernel data that may be described by one or more kernel matrices or tensors (hereinafter kernel matrix data element(s), marked as 'K'); and applying the kernel data on the input data in a convolution operation so as to obtain or calculate output data. The output data may be described by one or more output matrices or tensors (hereinafter output matrix data element(s), marked as 'O').

It may be appreciated that the matrices depicted in FIG. 3 may be of any dimension that may be appropriate to a specific application. In addition, the matrices depicted in FIG. 3 may include at least one dimension that pertains to or describes a spatial position of a data element in the matrix and/or at least one dimension that pertains to or describes a channel in the matrix.

For example, as shown in FIG. 3, input matrix I may be an input image. Input matrix data element I may thus include two dimensions (e.g., an X dimension and a Y dimension) that may describe a spatial position of a data element (e.g., a position of a pixel in the image) according to respective indices (e.g., X and Y indices respectively). In a neural network, each data element may be a value input to a "neuron" which may "process" the data element: neurons being typically virtual and processing typically being performed by mathematical constructs used to calculate the outputs of the virtual—e.g. simulated—neurons. Input matrix I (e.g., the image) may further include a dimension pertaining to, associated with or describing a channel (e.g., red, green and blue (RGB) channels of the input, marked as 1I, 2I, 3I, etc.). As shown in FIG. 3, spatial locations of data elements within each input channel (e.g., 1I, 2I, 3I) may be marked by an additional index (e.g., 1I1 and 1I2 pertaining to or describing input channel 1I, etc.). As elaborated herein, embodiments of the invention may be adapted to exploit activity sparsity of input matrix I, on one or more channels (e.g., 1I, 2I, 3I) thereof.

As known in the art, the one or more kernels K may include or may be organized in filters (e.g., marked 1K, 2K, etc.). Pertaining to the example of an image, a first filter (e.g., 1K) may be a high-pass filter whereas a second filter (e.g., 2K) may be a blurring filter. Each of the filters may include one or more channels (e.g., 1,1K, 1,2K and 1,3K pertaining to filter 1K and 2,1K, 2,2K and 2,3K pertaining to filter 2K). Pertaining to the example of an image, each channel of a filter may correspond to one or more channels of the input (e.g., 1,1K and 2,1K correspond to 1I, 1,2K and 2,2K correspond to 1I, and 1,3K and 2,3K correspond to 3I). As shown in FIG. 3, spatial locations of data elements within each kernel channel may be marked by an additional index (e.g., 2,1K1 and 2,1K2 pertaining to kernel channel 2,1K, etc.).

As known in the art, the one or more filters (e.g., 1K, 2K) may correspond to respective output channels. Pertaining to the example of an image, a first filter (e.g., 1K, the high pass filter) may correspond to a first output channel (e.g., 1O) and a second filter (e.g., 2K, the blur filter) may correspond to a second output channel (e.g., 2O). As shown in FIG. 3, spatial locations of data elements within each output channel (e.g., 1O, 2O) may be marked by an additional index (e.g., 1O1 and 1O2 pertaining to output channel 1O, and 2O1 and 2O2 pertaining to output channel 2O, etc.).

Figure 4A:
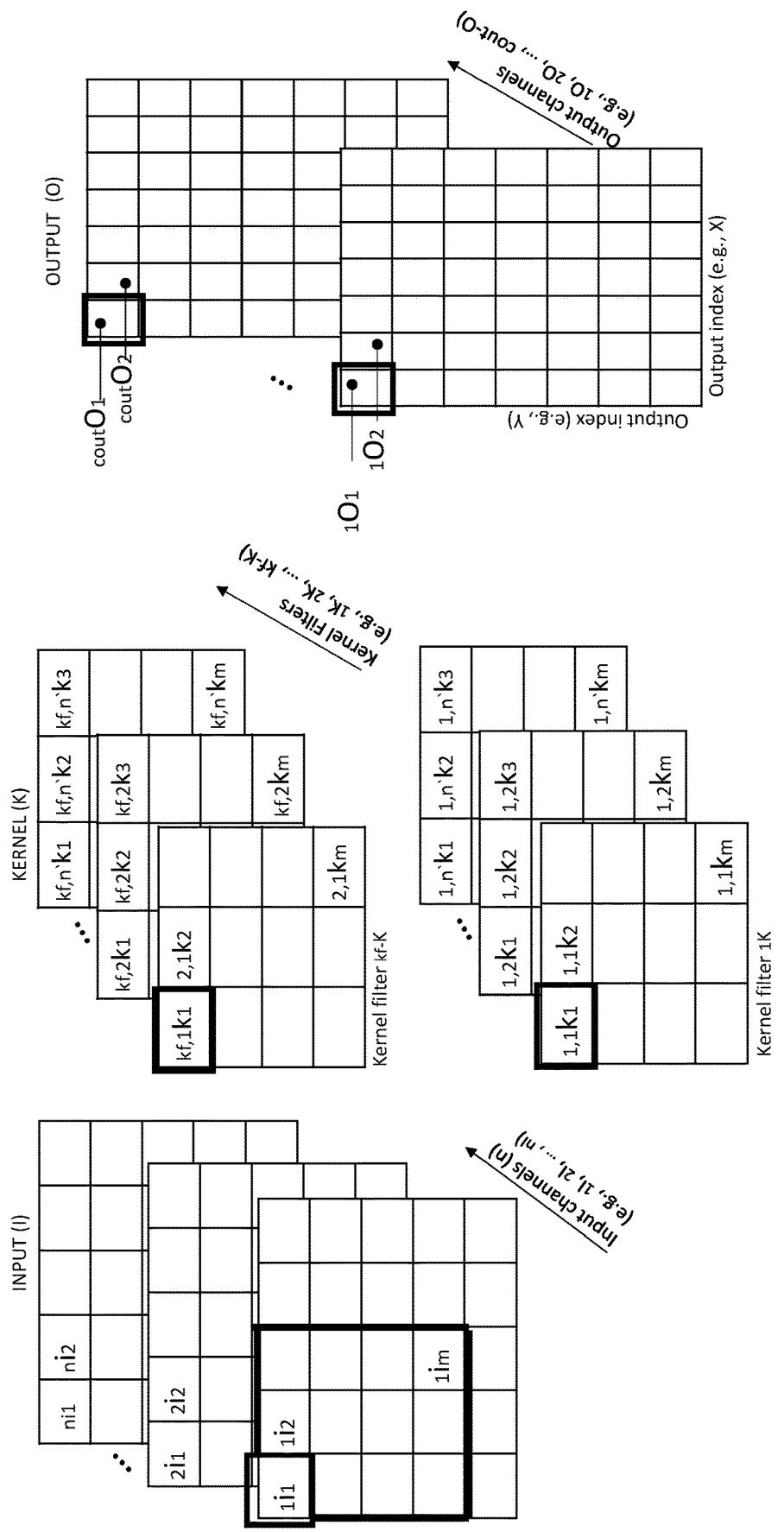
FIG. 4A and FIG. 4B are schematic diagrams, depicting an example iteration of performing compressed convolution using activation sparsity, according to some embodiments.
Figure 4B:
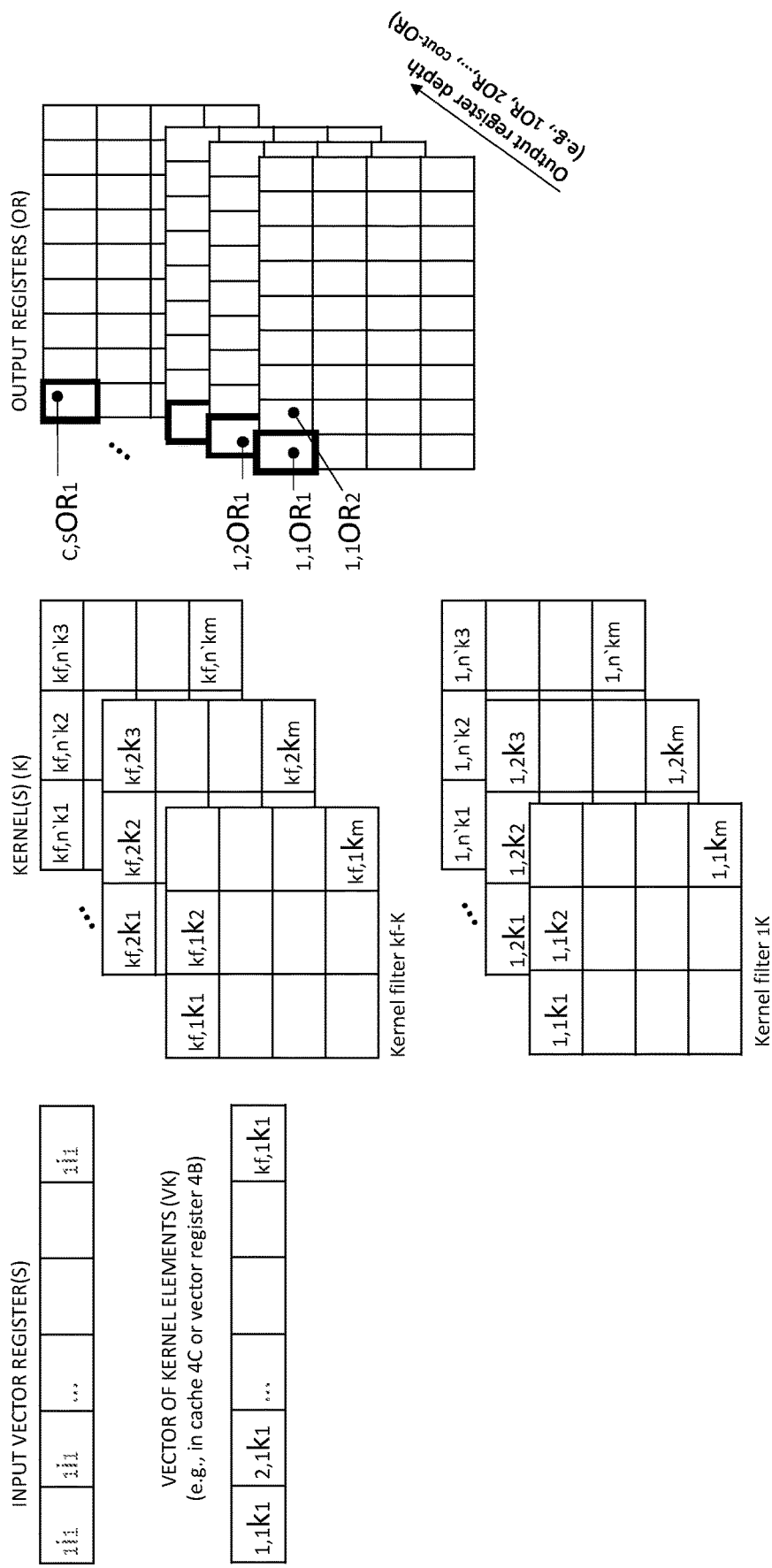

Reference is now made to FIG. 4A, and FIG. 4B which are schematic diagrams, depicting an iteration or loop of performing compressed convolution using activation sparsity, according to some embodiments.

In the notation used herein, the symbol '*' may be used to represent any value (e.g., a "don't care" value, as known in the art) of a relevant index. For example, the argument *I1 may represent an input data element, that may be included in input matrix data element I, and may pertain to any channel of I. Additionally, the symbol 'x' may be used to represent any specific value of a relevant index. For example, the argument 1Ix may represent a specific spatial position value (e.g., 1) of channel number 1 of input matrix data element I (e.g., 1I1).

As elaborated above, vectorizing sparse data may be difficult or even impossible to do efficiently. Therefore, embodiments of the invention may take a different approach to this problem: instead of vectorizing the unexpected, sparse input data of input matrix data element I, embodiments may vectorize data of the kernel filters (e.g., (1,*K*), (2,*K*), ..., (kf,*K*)).

As elaborated herein, output matrix data element O may represent one or more output channels (e.g., 1O*, 2O*, ..., cout-O*) of a convolution layer, where 'cout' may represent the number of output channels of the convolution layer. Output matrix data element O may also include a plurality of output spatial positions corresponding to output data elements of different output channels (e.g., *O1, corresponding to values 1O1 and 2O1, *O2 corresponding to values 1O2 and 2O2, etc.).

According to some embodiments, and as depicted in the example of FIG. 4A, the number of output channels (e.g., cout) may correspond to (e.g., may be equal to) the number of kernel filters (e.g., kf). It may be appreciated by a person skilled in the art that modifications to the algorithm may be made to implement embodiments in which kf may not be equivalent to cout.

Embodiments of the invention may traverse over spatial positions of the output matrix O, to perform the required convolution in a plurality of iterations: in each iteration a specific output spatial position Ox (e.g., O1) of the output matrix data element O may be selected, and values of the convolution outcome may be calculated per the selected specific output spatial position Ox (e.g., O1). As explained herein (e.g., in relation to FIG. 3), the selected, specific output spatial position Ox (e.g., O1) may correspond to a vector of indices of the output matrix data element O, and at least one (e.g., each) index of the vector of indices may pertain to or represent a different output channel (e.g., 1Ox, 2Ox, etc.) of the convolution layer.

Embodiments of the invention may select or determine a non-zero input element (e.g., 1I1) of an input matrix data element (e.g., element I, representing one or more input channels of or to the convolution layer), based on the selected output spatial position.

Selection or determination of the non-zero input element (e.g., 1I1) may include: (a) determining a spatial position of the input element (e.g., *I1), corresponding to the spatial position of the selected output element (e.g., *O1); and (b) selecting at least one non-zero input element (e.g., 1I1) of input matrix data element I among one or more input data elements corresponding to the determined spatial position (e.g., among 1I1, 2I1, . . . , nI1), as elaborated herein (e.g., in relation to FIG. 6).

As explained herein, a specific kernel spatial position Kx (e.g., K1) of a specific kernel filter (e.g., (x,*K)) may correspond to a plurality of values pertaining to or describing different kernel channels of that filter (e.g., (x,1Kx), (x,2Kx), (x,3Kx), . . . , (1,$n'$Kx)) where n' is a number (e.g., 16) of channels of the kernel filter. Additionally, a specific input spatial position *Ix may correspond to a plurality of values pertaining to different input channels (e.g., 1Ix, 2Ix, . . . , nIx).

According to some embodiments, and as depicted in the example of FIG. 4A, the number of input channels (n) may correspond to, or be equivalent to the number of channels (n') of each filter. For the purpose of clarity, the description hereinafter may adhere to this example, in which n is equivalent to n'. It may be appreciated by a person skilled in the art that modifications may be made to accommodate a condition or implementation in which the number of input channels (n) may not be equivalent to the number of channels (n') of each filter.

As known in the art, a value of a selected output spatial position (e.g., 1O1) may be contributed to by a multiplication of kernel filter values (e.g., 1,1K1, . . . 1,1Km) with corresponding input data elements (e.g., 1I1, . . . , 1Im, depicted by the frame of input data elements of FIG. 4A). Embodiments of the invention may select an input data element (e.g., an element of [1I1, . . . , 1Im], such as 1I1) corresponding to a kernel channel (e.g., 1,1K1, . . . , 1,1Km). In a notation used herein (e.g., in the pseudocode example brought below), an index of a spatial position (e.g., $x_1$) of the input data element (e.g., *I$x_1$) may be calculated as a function (e.g., a sum) of the selected spatial position (e.g., $x_2$) of an output data element (e.g., *O$x_2$) and one or more relevant spatial positions (e.g., $x_3$) of kernel data elements (e.g., *,*K$x_3$). For example, in this notation, x1 may be calculated as x1=x2+x3.

In the notation of the pseudocode example brought below, this calculation may be written as: i=o+k (e.g., for kernel spatial position indices between 0 and m−1) or as: i=o+(k−1) (e.g., for kernel spatial position indices between 1 and m).

Embodiments of the invention may produce, based on the selected output spatial position (e.g., *O1) and/or the determined non-zero input element (e.g., 1I1 a vector of kernel elements from the kernel matrix data element K (which, as elaborated herein, may represent one or more kernel channels of the convolution layer). For example, as depicted in FIG. 4A, given the specific output spatial position *O1, corresponding to framed output data elements 1O1, . . . , coutO1 (which correspond to output channels 1O, 2O, . . . , coutO respectively), and a non-zero input such as framed data element 1I1, a vector of kernel data elements may be selected (e.g., framed kernel elements [(1,1K1), (2,1K1), . . . , (kf,1K1)]) where kf is the number of kernel filters. The members of the vector of kernel data elements may be determined as the ones contributing to the convolution result of the selected output data element (e.g., *O1).

For example, embodiments of the invention may produce a vector of kernel elements by: (a) selecting a kernel position (e.g., *K1) of the kernel matrix data element K; (b) obtaining one or more kernel data elements (e.g., (1,1K1), (2,1K1), etc.) of the kernel matrix data element K, corresponding to the selected kernel position (e.g., *,*K1). The one or more (e.g., each) obtained kernel elements may correspond to different kernel filters (e.g., 1,1K, 2,1K, etc.). Additionally, each obtained kernel element may correspond to computation of an output of the convolution layer at the selected output spatial position (e.g., *O1).

As elaborated herein, each kernel element of the vector of kernel elements may correspond to a different kernel filter. According to some embodiments, the kernel matrix or tensor data element K may be pre-ordered (e.g., prior to inferring the NN on incoming data) such that the kernel vector may be sequentially stored in a memory device (e.g., RAM device 4A of FIG. 2) associated with the at least one processor (e.g., element 2 of FIG. 2). Thus, processor 2 may be able to contiguously read the kernel vector from the memory device (e.g., 4A) during execution or inference of the NN.

According to some embodiments, and as shown in the example of FIG. 4B, given a specific input data element (e.g., 1I1 that contains a scalar, non-zero input value, and given a specific kernel spatial location (e.g., *,*Kx), embodiments of the invention may perform a vectoral multiplication operation or multiplication and accumulation operation, multiplying a value of the specific non-zero input value (e.g., value of 1Ix') against all respective kernel values (e.g., 1,1Kx, 2,1Kx, . . . , kf,1Kx), where kf may be the number of kernel filters (and, as depicted herein, may be equal to the number of output channels cout).

Embodiments of the invention may accumulate (e.g. add to a previous accumulated result, the last or latest multiplication output) the products or results of the vectoral multiplication into a set of output vector registers OR (e.g., element 4B of FIG. 2). Each output vector register OR may correspond to a plurality of output channels of the convolution layer and/or to a fixed spatial location of the output matrix O of FIG. 4A.

Additionally, or alternatively, one or more output vector registers OR may include a plurality of output data elements or vector elements S (e.g., 16), depending upon the specific architecture of the computing device that may implement an embodiment of present invention. Each such output data element or vector element may correspond to a different output channel (e.g., 1O, 2O, . . . , coutO).

In the notation of FIG. 4B, each output register OR may have three indices: index1 index2 and index3, and may be presented in the following example format: [index1, index2 O index3], where:

Index1 ([1, . . . , C]) may represent a set of S (e.g., 16) output channels, such that S*C=cout (e.g., the number of output channels);

Index2 (1, . . . , S) may represent an offset or a specific output channel amongst the above set of S (e.g., 16) output channels (e.g., elements 1O, . . . , coutO of FIG. 4A); and Index3 may represent a corresponding spatial position of an output matrix data element of the convolutional layer. For the purpose of clarity, index3 may be denoted herein as representing a 1-dimensional spatial position of output matrix O. However, it may be appreciated by a person skilled in the art that index3 may represent a plurality of indices (e.g., index3-$x$ and index3-$y$) to correspond to a multi-dimensional spatial position output matrix O.

In the example of FIG. 4B, a single iteration of a vectoral multiplication is shown. The depicted iteration relates to a selected, single output spatial position (e.g., *O1) of an output matrix data element O and a single non-zero input data element (e.g., 1I1).

Embodiments of the invention may load (or broadcast, as commonly referred to in the art) a specific, non-zero input data element (e.g., 1I1) to occupy all values of one or more vector registers (e.g., element 4B of FIG. 2). As depicted in FIG. 4B, the one or more input vectors may thus include a plurality S (e.g., 16) of copies of the loaded or broadcast element (e.g., 1I1).

Additionally, embodiments of the invention may load elements of one or more corresponding kernel data element vectors (e.g., [(1,1K1), . . . , (kf,1K1)]) to a memory element such as a cache memory (e.g., element 4C of FIG. 2) or vector register (e.g., element 4B of FIG. 2). As known in the art, a single vectoral instruction, such as a vectoral FMA instruction or another suitable multiply-accumulate instruction may be executed to perform a vectoral multiplication operation, having as inputs: (a) the selected non-zero input element (e.g., 1I1, as multiple instances within the input vector register, as depicted in FIG. 4B), and (b) the produced vector of kernel elements (e.g., [(1,1K1), . . . , (kf,1K1)]). The product of the vectoral multiplication may be accumulated in an output vector register OR (e.g., element 4B of FIG. 2) of processor 2.

According to some embodiments, products of vectoral multiplications may be accumulated into vector registers (e.g., element 4B of FIG. 2) such that each vector register may include a plurality S (e.g., 16) of elements, and each element may correspond to a different output channel (e.g., 1O, . . . , coutO) of the convolution layer.

For example, as depicted in the example of FIG. 4B, a first vector register may include the framed elements [1,1OR1, 1,2OR2, . . . , c,sOR1]. After the first iteration (as explained above), the elements of the framed, first vector register may include the respective values of: [(1I1×1,1K1), (1I1×2,1K1), . . . , (1I1×kf,1K1)] (as explained herein, the number of kernel filters kf may be equal to the number of output channels cout, which in turn may be equal to the product of C*S).

As explained herein, the example of FIG. 4B depicts a single iteration of a vectoral multiplication operation. The order of the loops or iterations is explained herein, for example in relation to FIG. 5.

Figure 5:
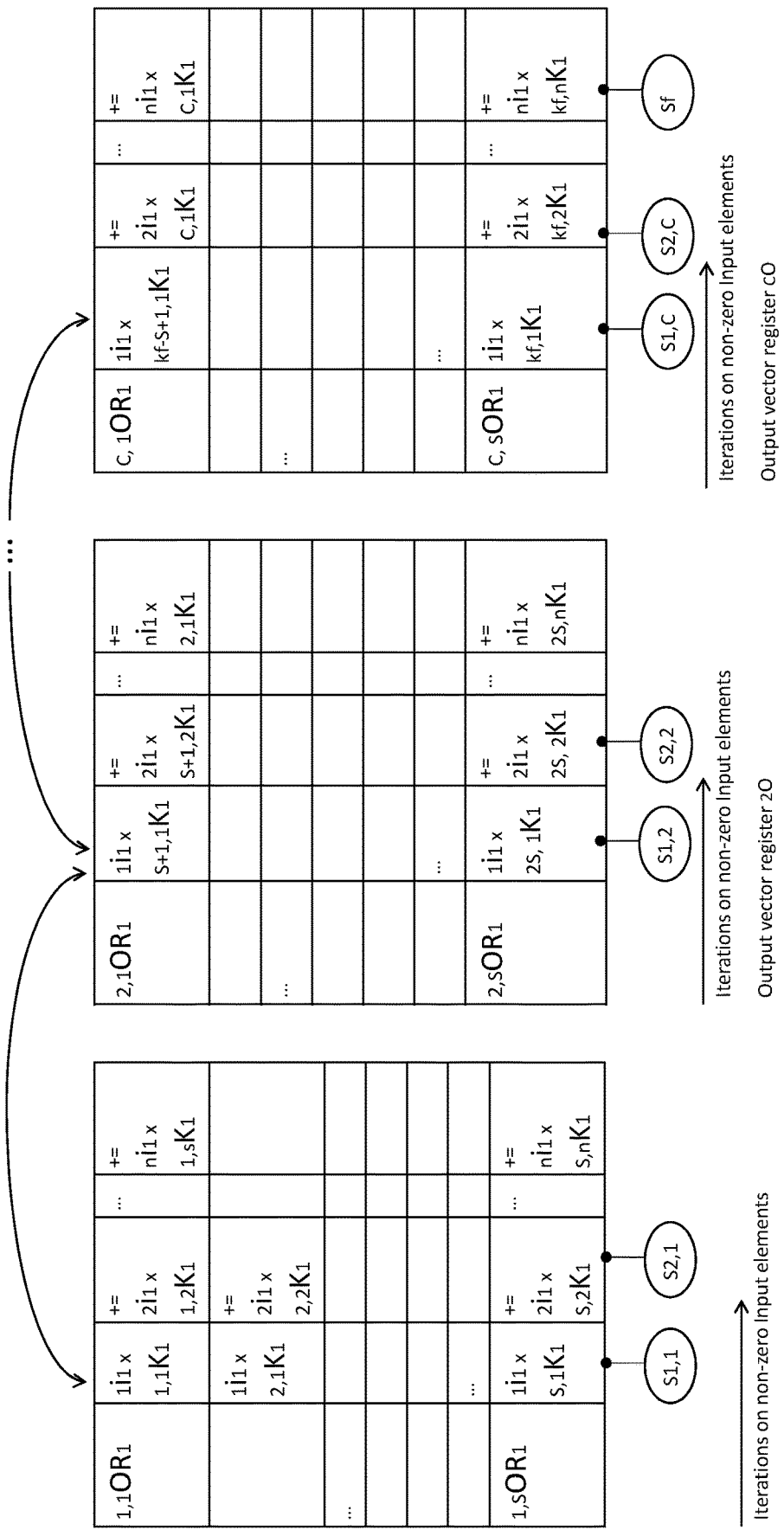
FIG. 5 is a schematic diagram, depicting example content of output registers according to iterations that may be included in a method of performing compressed convolution using activation sparsity, according to some embodiments.

Reference is now made to FIG. 5, which is a schematic diagram, depicting example content of output registers according to iterations that may be included in a method of performing compressed convolution using activation sparsity, according to some embodiments. The iterations of FIG. 5 may relate to calculation of the convolution at a single spatial position of output matrix data element O (that may correspond to one or more output channels, e.g., 1O, 2O, etc.).

As shown in the example of FIG. 5, in a first step (S1,1), a first selected, non-zero input data element 1I1 is vector-multiplied by a vector of all relevant kernel elements pertaining to the first S (e.g., 16) first output channels (e.g., 1O, . . . , SO). For example, as depicted in FIG. 5, in this first iteration, the first output register (e.g., 1,1OR1) corresponding to the first S channels (e.g., 1O, . . . , SO) may include the following elements: [(1I1×1,1K1), (1I1×2,1K1), . . . , (1I1×S,1K1)], each corresponding to a different output channel of the first S output channels.

In a subsequent step (S1,2), the first selected, non-zero input element 1I1 is vector-multiplied by a vector of all relevant kernel elements, pertaining to the subsequent (e.g. later in an ordered sequence) set of S output channels (e.g., SO, (S+1)O, . . . (2S)O). This process continues throughout the number of channel sets C, until step (S1,C), where the selected, non-zero input element 1I1 is vector-multiplied by a vector of all relevant kernel elements, pertaining to the last set of S output channels (e.g., [(cout-S)O, (cout-S+1)O, . . . , coutO], recall that cout may be equal to C×S).

Only then, after exhausting a plurality (e.g., all) vectoral multiplications that pertain to the selected, non-zero input data element 1I1, may the algorithm select, and turn to handle a subsequent (e.g. later in sequence according to some ordering) non-zero input data element.

In the example of FIG. 5, the subsequent input data element may be 2I1, corresponding to the same spatial position as 1I1, but relating to a subsequent input channel.

For example, as depicted in FIG. 5, in this second iteration, the first output register (e.g., 1,1OR1) corresponding to the first set of S output channels (e.g., 1O, . . . , SO) may include the following elements: [((1I1×1,1K1)+(2I1×1,2K1)), ((1I1×2,2K1)+(2I1×2,2K1)), . . . , ((1I1×S,1K1)+(2I1×S,2K1)].

Embodiment of the invention may thus continue to perform the vectoral multiplications that operate using or pertain to the second selected, non-zero input data element 2I1 in operations or steps S2,2 and S2,C, in a similar manner as discussed herein, e.g., in relation to steps S1,2 and S1,C respectively.

As explained herein, FIG. 5 may pertain to an iteration corresponding to a specific, selected output spatial position (*O1) and all non-zero input data elements of a selected input spatial position (e.g., non-zero elements among 1I1, 2I1, . . . , nI1 of FIG. 4A). Embodiments of the invention may thus continue the vectoral multiplication and accumulation with subsequent non-zero input data elements (e.g., non-zero elements among 3I1, 4I1, . . . , nI1), in a similar manner as discussed herein in relation to input data elements 1I1 and 2I1 until step Sf, which may represent the final the computation of the current iteration.

Embodiments of the invention may iterate or repeat (a) selection of non-zero input data elements; (b) production of relevant vector of kernel elements; and (c) performing vectoral computations (e.g., vectoral FMA computations) with subsequent vectors of kernel elements and/or input data elements so as to obtain an outcome of the convolution corresponding to the selected output spatial position.

According to some embodiments, having finalized the computation pertaining to a single iteration of FIG. 5 (e.g., an iteration pertaining to a specific output spatial position and a specific input spatial position) embodiments of the invention may proceed to compute accumulate the contribution of additional input data elements (e.g., of different input spatial positions) to output data elements of the selected output position (e.g., as shown in the frame of input data elements 1I1, . . . , 1Im, depicted in FIG. 4A).

Taking second input spatial position *I2 (e.g., 1I2, 2I2, . . . , nI2) as an example, in a subsequent iteration (e.g., as discussed in relation to FIG. 5), input data elements of the second input spatial position *I2 (e.g., 1I2, 2I2, . . . , nI2) may be vectorially multiplied against corresponding kernel data elements (e.g., 1,1,K2, 1,2,K2, . . . , kf,n'K(2), and accumulated into corresponding output register elements ((1,1,OR1), . . . , (C,SOR1)). For example, non-zero data element 1I2 may be multiplied with 1,1K2 and accumulated into output register element 1,1,OR1. In another example, non-zero data element 1I2 may be multiplied with 2,1K2 and may be accumulated into output register element 1,2OR1.

As explained herein, the iteration depicted in FIG. 5 may be repeated with different input spatial positions until one or more (e.g., all) values of channels pertaining to a specific output spatial position Ox (e.g., O1) are obtained. Embodiments may repeat the iteration of FIG. 5 with subsequent output spatial position, to obtain the outcome of the convolution for all output spatial positions.

In other words, embodiments may further repeat the aforementioned operations or steps of (a) selection of a spatial position of the output matrix data element (e.g., O1); (b) selection of a non-zero input element; (c) production of a vector of kernel elements; (d) performance of vectoral multiplication and accumulations into output registers; and (e) repetition of (c) and (d), with subsequent spatial position of the output matrix data element (e.g., *O2, *O3, etc.). Thus, embodiments of the invention may traverse over the spatial positions of the output of a convolution layer of a NN, so as to calculate or obtain an outcome of the convolution layer.

In other words, embodiments of the invention may perform vectoral multiplication and accumulation (MAC) operations, pertaining to a selected output spatial position and a selected input data element. The MAC operation may have as inputs for example a specific input data element of the compressed input representation (e.g., element CIV of FIG. 6) and one or more kernel data elements of the kernel matrix data element. Embodiments may repeat the MAC operations until all MAC calculations pertaining to the selected output spatial position and including the specific input data element may be exhausted (e.g., calculating all contributions of a specific input data element to a specific output spatial position). The MAC operations may be repeated with a subsequent specific input data element of the compressed input representation (e.g., by calculating all contributions of the subsequent input data element to the selected output spatial position). Embodiments may then repeat the MAC calculations with subsequent output spatial positions, to obtain an outcome of the convolution layer.

Embodiments of the invention may include further configurations that may improve the efficiency of executing a convolution layer in an NN, according to some embodiments.

For example, according to some embodiments of the invention, the kernel and output values may be arranged or laid in memory (e.g., a cache memory element 4C of FIG. 2) so that kernel elements (e.g., [(1,1Kx), (2,1Kx), (3,1Kx), . . . , (S,1Kx)] and/or corresponding output data elements [1,1Ox', 1,2Ox', . . . , 1,S0x'] are contiguous for a fixed value of x and x'.

In other words, output data elements corresponding to vectors of indices of the output matrix having a specific spatial position (e.g., [1,1Ox', 1,2Ox', . . . , 1,SOx']) may be sequentially stored in a memory device (e.g., RAM element 4A, cache element 4C, etc.) associated with a controller or processor (e.g., element 2 of FIG. 2). This may enable processor 2 to contiguously read output data elements corresponding to a specific output spatial position.

Embodiments of the invention may subsequently: (a) load a vector of kernel values (e.g., [(1,1Kx), (2,1Kx), (3,1Kx), . . . , (S,1Kx)]) pertaining to the fixed location x into a vector register, multiply the vector register against the scalar input (e.g., 1I1), and accumulate the product of the multiplication into elements of an output vector (e.g., [1,1Ox', 1,2Ox', . . . , 1,SOx']), using a single FMA instruction.

As explained herein, the extraction or selection of non-zero input data elements of input matrix data element I, and the exhaustive reuse thereof in vectoral multiplication operations, may enable embodiments of the invention to exploit the NN layer's activation sparsity.

Figure 6:
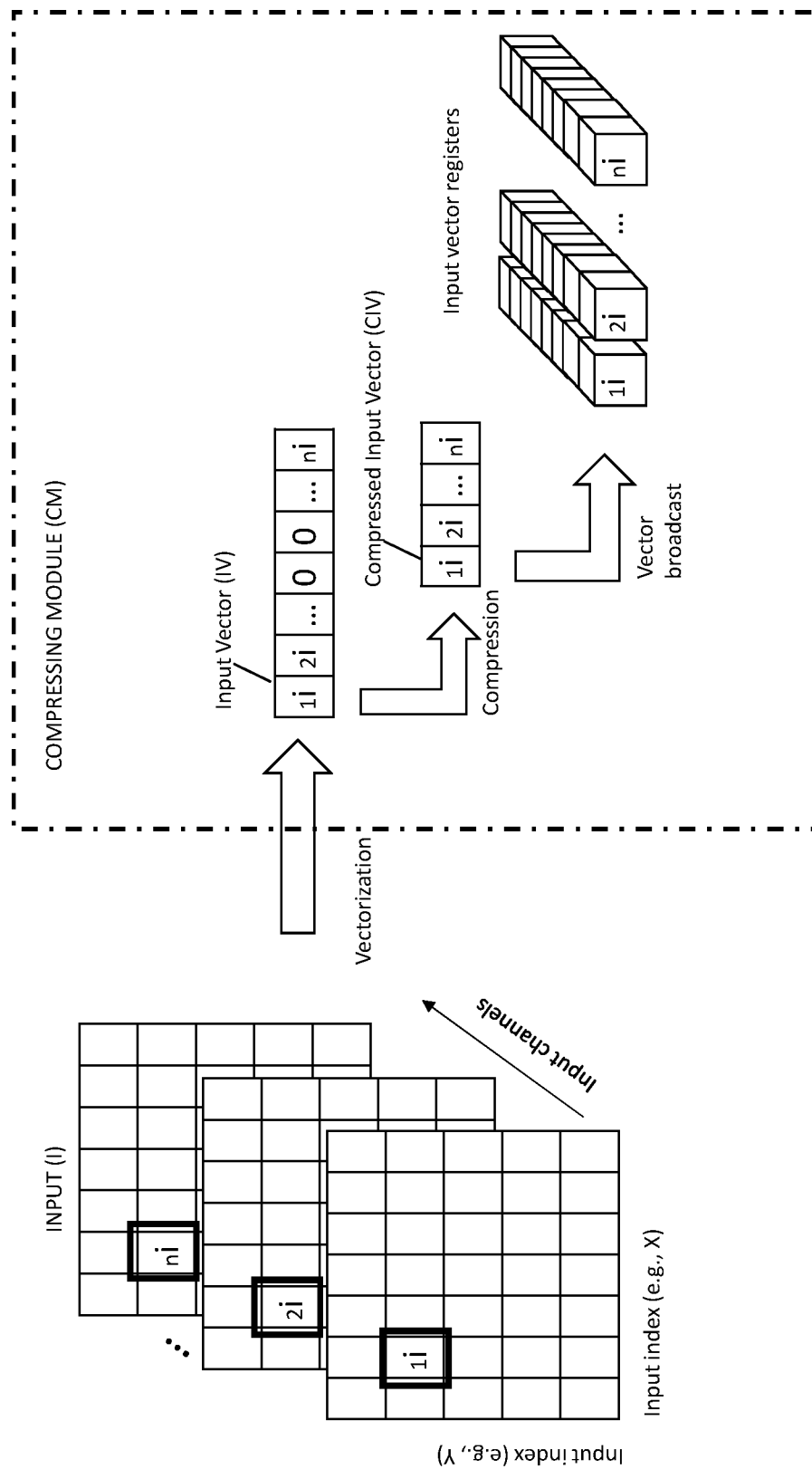
FIG. 6 is a schematic diagram, depicting an example of compression and broadcasting of input elements, that may be included in a method of performing compressed convolution using activation sparsity, according to some embodiments.

Reference is now made to FIG. 6, which is a schematic diagram, depicting an example of compression (e.g., removal or omission of zero-valued elements) and broadcasting of input data elements, that may be included in a method of performing convolution in NN layer, according to some embodiments.

For example, embodiments of the invention may include a compressing module (CM, e.g., elements CM1 through CM8 of FIG. 1) or function, between each pair of adjacent ReLU and convolution layers. According to some embodiments, CM may be part of a NN inference process, and thus may be or may include, for example a software process or thread, and may be executed, for example, by a processor such as controller 2 of FIG. 2.

As depicted in FIG. 6, compressing modules CM (e.g., CM1 through CM8) may take sparse output of a preceding ReLU layer (e.g., input matrix data element, I) pertaining to a specific input spatial position and vectorize (e.g., organize within a vector of data elements) the input data elements corresponding to that specific input spatial position (e.g., 1i, 2i, . . . , ni, corresponding to different input channels).

Compressing modules CM may convert an element or vector of input data elements (e.g., 1I, 2I, 3I, . . . , nI) and produce a compressed data element. For example, CM may omit or delete zero-valued data elements of the vector of input data elements, to produce a compressed input vector (CIV) including non-zero elements.

As elaborated herein (e.g., in relation to FIG. 4A and/or FIG. 4B), embodiments of the invention may: (a) select an output spatial position; (b) determine a spatial position in the input matrix data element that corresponds to the selected output spatial position; (c) obtain a vector of input data elements of the input matrix data element, corresponding to the determined input spatial position (e.g., where each input element of the vector of input elements corresponds to a different input channel); and (d) compress the vector of input elements to obtain a compressed input vector data element that is devoid of zero-valued input data elements. Embodiment of the invention may then select a non-zero input data element by traversing an index of the compressed input vector data element to select one or more non-zero input data elements (e.g., sequentially, throughout the length of the compressed input vector data element).

According to some embodiments, the compressed input data vector may be or may include an organization of the non-zero input data elements in a CSR format, which may be propagated as dense input to subsequent convolution layer of the NN. Other suitable compression formats and compression techniques may also be used.

According to some embodiments, the CSR representation may include four component arrays: (a) a value array which may include all of the non-zero input elements in contiguous memory; (b) an index array which may include the indices of the elements in the input matrix data element I, within their respective row; (c) a row length array, which may include the number of non-zero elements of each row; and (d) a row offset array, which may include the offset denoting the first element of value array element and an index array element corresponding to a given row.

For example, in a condition in which the input matrix data element I may be:

$$I = \begin{matrix} 0 & 2 & 3 \\ 1 & -1 & 0 \\ 0 & 0 & 4 \end{matrix}$$

The corresponding CSR arrays may include the following example arrays:

Value array = | 2 | 3 | 1 | −1 | 4 |

Index array = | 1 | 2 | 0 | 1 | 2 |

Row length array = | 2 | 2 | 1 |

Row offset array = | 0 | 2 | 4 |

Other compression techniques may be used. It may be appreciated by a person skilled in the art that despite the seemingly increased logical complexity of a CSR representation, in relation to a standard representation (possibly including a plurality of zero values), the memory footprint of a CSR representation may still be significantly reduced when the input is more than 50% sparse. In particular, the value array and the index array may each contain one entry per non-zero input data element, and the row length and row offset arrays may contain only one entry per row (and thus may have a negligible memory footprint).

Therefore, the total space required for the CSR representation may be approximated as $2\alpha M$, $\alpha$ may be a percentage of non-zero input values and M may be the space requirement of a dense representation. A value of $a\alpha$ that is below 50\% may thus constitute a reduction in memory footprint.

Embodiments of the invention may further reduce the memory footprint by representing data of the index array, row length array and/or row offset array, using fewer data bits (e.g., 1 or 2 data bytes) in relation to the representation of the information of the value array (e.g., 4 data bytes).

Embodiments of the invention may further reduce memory footprint by reducing the precision of representation of value array elements (e.g., from a 4 byte floating point representation to a 2 byte or 1 byte representation).

It may be appreciated by a person skilled in the art that additional (e.g., more complex) compression or optimization of memory footprint of input matrix data element I may be applied.

As described herein, embodiments of the invention may initialize several output vector registers (OR1, . . . , ORC) which will be accumulated into. Embodiments may then loop over inputs, and broadcast a scalar input value to an input vector register IR. Embodiments may performing a vectoral operation such as a multiplication-accumulation operation (e.g., FMA) by multiplying IR against a corresponding vector of kernel values from memory (e.g., a cache memory such as element 4B of FIG. 2) to accumulate into each output vector register OR (OR1, . . . , ORC).

The following text includes example pseudocode that may represent a method for calculating a convolution in a layer (e.g., a convolutional layer) of a NN. Other specific code or operations may be used.

```
for k = 0 to K_x − 1
    for o = 0 to O_x − 1
    // Traversing over output spatial positions
        Let out_vec[0...C−1] = C[o,0...C−1];
    //out_vec may be an array of C separate output vectors, with S
    //(e.g., 16)data elements apiece
        Let i = o + k;
    // Selection of an input spatial position index
        Let L = lengths[i];
    // L may be the number of non-zero input data elements corresponding
    // to spatial position index i
        Let row_offset = offsets[i];
    // Finding the location of the first input with spatial position    //
    index i
        for l = 0 to L − 1
    // Traversing over non-zero input data elements corresponding to    //
    spatial position index i
            Let ic = index_array[l];
    // the input channel number of the l'th non-zero input
            Let in_location = I + row_offset + l;
    // location in memory of the non-zero input data element
            Let in_vec = broadcast(in_location);
    // broadcast S (e.g., 16) copies of the input value to an input    //
    vector
            for oc = 0 to C − 1
    // traverse over C output channels
                FMA(in_vec, K[oc,ic,k], out_vec[oc]);
    // Perform an FMA function, having respective input values and kernel
    // values as multiplication operands, and accumulating the result    //
    into the corresponding output vector register out_vec[oc]
            end for
    // for oc = 0 to C − 1
        end for
    // for l = 0 to L − 1
        store out_vec[0...C−1] to O[o,0...C−1];
    // storing the outcome all channels pertaining to a specific output //
    spatial position
        end for
    // for o = 0 to O_x − 1
end for
// for k = 0 to K_x − 1
```

The order of loops in the pseudocode may be chosen carefully to maximize the resource utilization of the memory system. For example, typical kernel sizes may be 3×3×64× 64 and may require 4 bytes per each value (e.g., weight). The total memory footprint of the kernels may thus require approximately 150 KB. Modern CPUs typically include a 32 KB L1 cache, (e.g., too small to fit all the kernel values). Therefore, the kernel data elements may need to reside in the L2 cache. As explained herein, the present invention may not include reuse of kernel values and therefore may require loading a new kernel value for each FMA instruction. As a result, waiting on L2 may become a bottleneck, and may decrease the efficiency of calculation. By looping over the spatial locations in the kernels in the loop, the working set for each outer loop iteration may become only 64×64, and the corresponding memory footprint may thus be reduced to approximately 16 KB, thus fitting in the L1 cache and significantly increasing compute utilization.

In a second loop of the pseudocode, embodiments of the invention may traverse over the spatial dimensions of the output. By doing so, embodiments may fix or allocate a small set of output vectors (e.g., 64) to accumulate to. The output vectors may, for example, be allocated in vector registers (e.g., element 4B of FIG. 2) as every FMA within each iteration of this loop will accumulate to one of these vector registers.

In the next loop of the pseudocode, embodiments may traverse over the non-zero elements of the input channel row. According to some embodiments, the non-zero input data elements may not reside in the L1 cache, so there may be some wait time to load these values. However, as described herein (e.g., in relation to FIG. 5), once loaded, embodiments may multiply the loaded values against every relevant kernel element to compute a contribution of the loaded, non-zero element to each output that is currently being accumulating into. Therefore, by iterating over input channels before output channels, embodiments may broadcast each input value to a vector register only once and then reuse it for every output channel.

Embodiments of the invention may subsequently loop over output channels, to conclude the computation of each value of each output channel pertaining to the current output spatial position. This computation may be highly efficient, since all the corresponding outputs values may have already been loaded into registers, at this stage.

Embodiments of the invention may preload data onto a memory of the processing unit (element 2 of FIG. 2) so as to prepare data for future calculations of convolution results.

For example, embodiments of the invention may, in a first iteration of a selected output spatial position, preloading one or more compressed input vectors (e.g., CIV element of FIG. 6) that may include one or more non-zero input data elements to a cache memory (e.g., element 4C of FIG. 2) associated with the at least one processor or controller (element 2 of FIG. 2), where the preloaded one or more compressed input data elements may pertain to computation of a second (e.g., later or subsequent) iteration of a selected output spatial position.

In another example, embodiments of the invention may, in a first iteration of a selected output spatial position and a first selected non-zero input data element, preload one or more kernel data elements of the kernel matrix data element K, pertaining to one or more kernel channels to a cache memory associated with the at least one processor. The preloaded one or more kernel elements may pertain to computation of a second, subsequent iteration of a selected output spatial position and a second selected non-zero input data element.

Reference is now made to FIG. 7, which is a flow diagram, depicting a method of executing a convolution layer of a neural network, by at least one processor or controller (e.g., element 2 of FIG. 2, but other suitable hardware may be used), according to some embodiments.

As depicted in step S1005, the at least one controller or processor (e.g. processor 2 or another suitable processor) may select an output spatial position (e.g., element *O1 of FIG. 4A) of an output matrix data element (e.g., element O of FIG. 4A). The output matrix data element (e.g., *O1) may represent one or more output channels of the convolution layer. For example, the output matrix data element of output position *O1 may correspond to one or more output data elements pertaining to different output channels, such as: 1O1, 2O1, . . . , coutO1.

As depicted in step S1010, the at least one controller or processor 2 may select, based on the selected output spatial position (e.g., *O1), a non-zero input data element (e.g., element 1I1 of FIG. 4A) of an input matrix data element (e.g., element I of FIG. 4A, representing one or more input channels of the convolution layer).

As depicted in step S1015, the at least one processor 2 may produce, based on the selected output spatial position, a vector of kernel elements (e.g., element VK of FIG. 4B) from a kernel matrix data element (e.g., element K of FIG. 4A). Kernel matrix K may represent one or more kernel channels (e.g., (*, *K)) of the convolution layer.

As depicted in step S1020, the at least one processor 2 may perform a vectoral multiplication operation or multiplication and accumulation operation (e.g. using an FMA instruction or other suitable instruction), having as inputs the selected non-zero input element (e.g., 1I1) and the produced vector of kernel elements (e.g., VK). The at least one processor 2 may accumulate a product of the vectoral multiplication in a vector register of the processor (e.g., elements *,*OR* of FIG. 4B and/or FIG. 5).

As depicted in step S1025, the at least one processor 2 may repeat the operations of producing a vector of kernel element VK, performing a vectoral multiplication and accumulation of a product of the vectoral multiplication in a vector register, with subsequent non-zero input elements and with corresponding vectors of kernel elements, as elaborated herein (e.g., in relation to FIG. 4B and/or FIG. 5). Hence an output or outcome of the convolution corresponding to the selected output spatial position may be obtained.

As depicted in step S1030, the at least one processor 2 may repeat the above operations or steps with a subsequent selection of output spatial positions, so as to calculate or obtain an outcome of the convolution layer, as elaborated herein (e.g., in relation to FIG. 4B and/or FIG. 5).

Other or different operations may be used.

As elaborated herein, embodiments of the invention may provide a practical application to efficiently execute computation such as convolution in a NN. Embodiments may provide an improvement over present technology by overcoming the challenges mentioned above, deriving from the inefficient process of vectorizing sparse input data. It may be appreciated by a person skilled in the art that vectorizing data over output channels (e.g., over kernel filters) as described herein may overcome the aforementioned challenges by: (a) avoiding the need to vectorize sparse input data I and treating the sparse input data elements as scalars instead; and (b) providing maximal reuse for each input by accumulating each loaded input value into cout different outputs.

As known in the art, currently available systems for performing convolution in a NN layer may exploit sparsity that may be structurally inherent to the NN, such a sparsity of kernel matrices. In contrast, embodiments of the invention may provide an improvement over prior art by addressing and exploiting sparsity of data input (e.g., input to the NN or to any layer thereof) and may not be known or predicted prior to inferring the NN on actual incoming data.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of executing a convolution layer of a neural network, by at least one processor, the method comprising:
   a. selecting an output spatial position of an output matrix data element, the output matrix data element representing one or more output channels of the convolution layer;
   b. selecting, based on the selected output spatial position, a non-zero input element of an input matrix data element, the input matrix representing one or more input channels of the convolution layer;
   c. producing, based on the selected output spatial position, a vector of kernel elements from a kernel matrix data element, the kernel matrix representing one or more kernel channels of the convolution layer;
   d. performing a vectoral multiplication operation, having as inputs the selected non-zero input element and the produced vector of kernel elements, and accumulating a product of the vectoral multiplication in a vector register of the processor;
   e. repeating operations c and d with subsequent non-zero input elements and corresponding vectors of kernel elements so as to obtain an outcome of the convolution corresponding to the selected output spatial position; and
   f. repeating operations a through e with subsequent selection of output spatial positions, so as to obtain an outcome of the convolution layer.

2. The method of claim 1, wherein the selected output spatial position corresponds to a vector of indices of the output matrix, wherein each index of the vector of indices pertains to a different output channel of the convolution layer, and wherein the products of vectoral multiplications are accumulated in vector registers such that in each vector register, each element corresponds to a different output channel of the convolution layer.

3. The method of claim 2, wherein output data elements corresponding to vectors of indices of the output matrix having a specific spatial position are sequentially stored in a memory device associated with the at least one processor, so as to enable contiguous reading of output data elements corresponding to a specific output spatial position.

4. The method of claim 1, wherein selecting a non-zero input element comprises:
   determining a position of the input matrix, corresponding to the selected output spatial position;
   obtaining a vector of input elements of the input matrix corresponding to the determined input spatial position, wherein each input element of the vector of input elements corresponds to a different input channel;
   compressing the vector of input elements to produce a compressed input vector data element, devoid of zero-valued input elements; and
   traversing an index of the compressed input data element to select non-zero input elements.

5. The method of claim 4, wherein the produced compressed input vector data element is a Compressed Sparse Row (CSR) representation of the input matrix.

6. The method of claim 4, further comprising, in a first iteration of a selected output spatial position, preloading one or more compressed input data elements to a cache memory associated with the at least one processor, wherein the preloaded one or more compressed input data elements pertain to computation of a second, subsequent iteration of a selected output spatial position.

7. The method of claim 1, wherein each kernel element of the vector of kernel elements corresponds to a different kernel filter, and wherein the kernel vector is sequentially stored in a memory device associated with the at least one processor so as to enable contiguous reading of the kernel vector from the memory device.

8. The method of claim 1, further comprising, in a first iteration, pertaining to a first selected non-zero input data element, preloading one or more kernel elements of the kernel matrix, pertaining to one or more kernel channels to a cache memory associated with the at least one processor, wherein the preloaded one or more kernel elements pertain to computation of a second, subsequent iteration pertaining to a second selected non-zero input data element.

9. The method of claim 1, wherein producing the vector of kernel elements comprises:
   selecting a kernel position of the kernel matrix data element;
   obtaining one or more kernel elements of the kernel matrix data element, corresponding to the selected kernel position, wherein each obtained kernel element corresponds to a different kernel channel of the convolution layer, and wherein each obtained kernel element corresponds to computation of an output of the convolution layer at the selected output spatial position.

10. A system for executing a convolution layer of a neural network, the system comprising: a non-transitory memory device, wherein modules of instruction code are stored, and at least one processor associated with the memory device, and configured to execute the modules of instruction code, whereupon execution of said modules of instruction code, the processor is further configured to:
   a. select an output spatial position of an output matrix data element, the output matrix data element representing one or more output channels of the convolution layer;
   b. select, based on the selected output spatial position, a non-zero input element of an input matrix data element, the input matrix representing one or more input channels of the convolution layer;
   c. produce, based on the selected output spatial position, a vector of kernel elements from a kernel matrix data element, the kernel matrix representing one or more kernel channels of the convolution layer;
   d. perform a vectoral multiplication operation, having as inputs the selected non-zero input element and the produced vector of kernel elements, and accumulate a product of the vectoral multiplication in a vector register of the processor;
   e. repeat operations c and d with subsequent non-zero input elements and corresponding vectors of kernel elements so as to obtain an outcome of the convolution corresponding to the selected output spatial position; and
   f. repeat operations a through e with subsequent selection of output spatial positions, so as to obtain an outcome of the convolution layer.

11. The system of claim 10, wherein the selected output spatial position corresponds to a vector of indices of the output matrix, wherein each index of the vector of indices pertains to a different output channel of the convolution layer, and wherein the at least one processor is configured to accumulate the products of vectoral multiplications in vector registers associated with the at least one processor, such that in each vector register, each element corresponds to a different output channel of the convolution layer.

12. The system of claim 11, wherein the at least one processor is configured to sequentially store output data elements corresponding to vectors of indices of the output matrix, having a specific spatial position, in a memory device associated with the at least one processor, so as to enable contiguous reading of output data elements corresponding to a specific output spatial position.

13. The system of claim 10, wherein the at least one processor is configured to select a non-zero input element by:
   determining a position of the input matrix, corresponding to the selected output spatial position;
   obtaining a vector of input elements of the input matrix corresponding to the determined input spatial position, wherein each input element of the vector of input elements corresponds to a different input channel;
   compressing the vector of input elements to produce a compressed input vector data element, devoid of zero-valued input elements; and
   traversing an index of the compressed input data element to select non-zero input elements.

14. The system of claim 13, wherein the produced compressed input vector data element is a Compressed Sparse Row (CSR) representation of the input matrix.

15. The system of claim 13, wherein the at least one processor is configured to preload, in a first iteration of a selected output spatial position, one or more compressed input data elements to a cache memory associated with the at least one processor, wherein the preloaded one or more compressed input data elements pertain to computation of a second, subsequent iteration of a selected output spatial position.

16. The system of claim 10, wherein each kernel element of the vector of kernel elements corresponds to a different kernel filter, and wherein the at least one processor is configured to sequentially store the kernel vector in a memory device associated with the at least one processor, so as to enable contiguous reading of the kernel vector from the memory device.

17. The system of claim 10, wherein the at least one processor is configured to preload, in a first iteration pertaining to a first selected non-zero input data element, one or more kernel elements of the kernel matrix, pertaining to one or more kernel channels, to a cache memory associated with the at least one processor, wherein the preloaded one or more kernel elements pertain to computation of a second, subsequent iteration, pertaining to a second selected non-zero input data element.

18. The system of claim 10, wherein the at least one processor is configured to produce the vector of kernel elements by:
   selecting a kernel position of the kernel matrix data element;
   obtaining one or more kernel elements of the kernel matrix data element, corresponding to the selected kernel position, wherein each obtained kernel element corresponds to a different kernel channel of the convolution layer, and wherein each obtained kernel element corresponds to computation of an output of the convolution layer at the selected output spatial position.

19. A method of executing a convolution layer of a neural network, by at least one processor, the method comprising:
   a. receiving a sparse input matrix data element representing input data of the convolution layer, comprising one or more input channels;
   b. receiving a kernel a matrix data element representing one or more kernel channels of the convolution layer;
   c. compressing the sparse input matrix data element to obtain a compressed input representation of the input data that is devoid of zero-value input data elements;
   d. selecting an output spatial position of an output matrix data element, the output matrix data element representing one or more output channels of the convolution layer;
   e. performing a multiplication and accumulation (MAC) operation pertaining to the selected output spatial position, the MAC operation having as inputs: a specific input data element of the compressed input representation and one or more kernel data elements of the kernel matrix data element;
   f. repeating operation (e) until all MAC calculations pertaining to the selected output spatial position and comprising the specific input data element are exhausted;
   g. repeating operation (e) and (f) with a subsequent specific input data element of the compressed input representation; and
   h. repeating operations (e) through (g) with a subsequent output spatial positions, to obtain an outcome of the convolution layer.

\* \* \* \* \*